XR 2,759,855 SR

SS REFERENCE

SEARCH ROOM

Aug. 21, 1956 W. E. MEDCALF ET AL 2,759,855

COATED ELECTRONIC DEVICE AND METHOD OF MAKING SAME

Filed Aug. 24, 1953

INVENTOR.
William E. Medcalf
Robert K. Riel
BY
Wood, Herron + Evans
Attorneys.

United States Patent Office 2,759,855

Patented Aug. 21, 1956

2,759,855

COATED ELECTRONIC DEVICE AND METHOD OF MAKING SAME

William E. Medcalf and Robert K. Riel, Joplin, Mo., assignors to The Eagle-Picher Company, Cincinnati, Ohio, a corporation of Ohio Application August 24, 1953, Serial No. 376,214

13 Claims. (Cl. 117—227)

This invention relates to devices for rectifying alternating current and to a method of making such devices. The invention also relates to a method of producing films of germanium which are permanently attached to the surface of an electrical conductor and which, selectively, may be of either the P-type or the N-type.

In the recent past, various electronic devices have been developed which utilize metallic germanium as the critical element. These devices have been used and are being used as substitutes for vacuum tubes for the purpose of rectifying alternating current and for amplification of electrical signals. The germanium, as used in such devices, usually contains minute impurities which determine its electrical conductivity characteristics. One type of conductive crystal is called the P-type and the other the N-type. Due to differences in the nature of the conductivity, each type is susceptible to uses in electronics wherein it is more desirable than the other, but for many purposes, including rectification of alternating current, the N-type is regarded as superior. One object of this invention is to provide an improved method of producing germanium films of the N-type.

The method of the present invention may be employed to produce germanium films of either the P-type or the N-type, but at present, the production of films of the N-type is regarded as the more difficult and important. Bulk germanium metal, as prepared from highly purified $GeO_2$ or $GeCl_4$ or from the commercial grades of these compounds, is invariably a semi-conductor of the preferred N-type, and it is generally thought throughout the trade that the metal is always N-type due to the presence of so-called N-type impurities which are in such small quantity that they have not been or cannot be detected. Also, it is theoretically true that germanium metal of complete purity would have N-type conduction because the electrons which cause N-type conduction have greater mobility than the holes which cause P-type conduction. Heretofore, however, all germanium films, regardless of the method of deposition, have been of the less preferred P-type, except in those cases where appreciable amounts of donor type impurities such as As, Sb, etc. have been added during the film deposition. Such impurities, added in the appreciable amounts necessary to produce N-type conduction, decrease certain electrical properties such as resistivity, peak inverse voltage and rectification efficiency below the desired values. With the films of the present invention, the difference between the P-type and N-type is controlled, not by the addition of impurities, but by close control of the temperature at which the germanium films are deposited.

From the point of view of conservation of germanium, the present invention is also of significance. At the present time, germanium is obtained primarily as a by-product of smelting of zinc ores of specific types which are not too abundant. While other sources of germaninum exist in certain types of coal for instance, the percentage of germanium present is not great and the recovery of it is difficult and expensive. The present invention is intended to further the conservation of germanium by making a small quantity of it perform the functions for which larger quantities have been required in the past.

It has been conventional to use germanium in electronic devices in the form of thin sheets or films sawed from relatively massive ingots. The problem of sawing ingots of germanium into slices of thickness no greater than necessary to perform the requisite electronic functions is not an easy task, and in any event, about 85% of germanium of the ingot is reduced to dust which is contaminated by the wear from the saw blade and difficult to recover in a pure state. One object of this invention is to obviate this wastage.

For the purpose of illustrating the present invention, the production of a rectifier utilizing germanium crystals of the N-type will be used as exemplary. The production of such a rectifier is another object of this invention.

This invention resides in the discovery and determination that very thin germanium films may be permanently bonded to graphite to provide films of either the P-type or the N-type, and that the films of the N-type, so produced, may, in performance and efficiency, approximate or equal germanium rectifiers made from massive metal.

The deposit of germanium films on the graphite is accomplished by exposing the graphite to the gaseous phase reduction of a germanium tetrahalide by hydrogen. The graphite is maintained at a temperature below the melting point of metallic germanium, and by control of the temperature of the graphite, selection between a P-tpye of film and an N-type of film may be made.

Germanium films deposited on graphite have a significant advantage over films deposited on any other base material. The corrosive atmosphere of the reaction which provides hydrogen chloride and various germanium chlorides as by-products involves a secondary reaction with any metallic base or support metal, causing the film in every case to be contaminated with atoms of the base or support element. Even the relatively inert metals, such as tungsten, tantalum, etc., cause the introduction of these metallic impurities into the germanium film. While inert, non-metallic materials such as quartz and lavite might physically be used as base support for the films without the introduction of impurities, still, such materials are non-conductors and the use of such coated non-conductors in electronic devices is undesirable for that reason.

We have found, however, that the employment of graphite as a support for a germanium film (1) allows the production of a strong physical bond between support and film, (2) provides a non-metallic support incapable of introducing either donor or acceptor impurities, (3) affords a support which catalyzes the reduction of $GeCl_4$ with hydrogen, (4) provides a base with sufficient electrical inductance to allow preferred electrical inductance heating, and (5) provides a base with sufficient electrical conductance to allow its use in electronic devices.

In the practice of this invention, the germanium is caused to deposit on the graphite in the general temperature range of approximately 700 to 930° C., and the N-type deposits are produced in the upper portion of the temperature range. For the best N-type deposits, the general range of 900 to 930° C., and particularly the range of 915 to 920° C., is preferred, although N-type films may be obtained at temperatures as low as 850° C. If desired, impurities may be introduced to further the deposition of the N-type of germanium deposit, but the use of these impurities is not necessary and in most cases is undesirable. In fact, the purity of a germanium film deposited on graphite, even an N-type film, may be as high as 99.9999%, i. e., the impurities need not exceed .0001% and need not be of any specific sort.

Further, in accordance with this invention, the graphite elements bearing germanium deposts may be annealed, as a secondary step, to improve the electrical properties of the germanium films. We have discovered and determined that if such a graphite element bearing such an N-type Ge deposit is annealed at a temperature just sufficient to cause incipient fusion of the deposited Ge and then is allowed to cool slowly, both the peak inverse voltage and the forward electrical conductance of the film is materially improved. The annealing does not disturb the fastness of the bond of the germanium to the graphite.

More particularly, we have discovered that if germanium is deposited upon graphite, as described, at a temperature which is in the lower range, for instance approximately 700 to 800° C., then the germanium deposits upon the graphite rather evenly in relatively minute particles, or crystals, or crystallites. Films formed in this temperature range are of the P-type. As the temperature is increased the crystals or crystallites of germanium which are deposited on the surface of the graphite become larger and larger and tend to become more and more of the N-type, so that films deposited between 900 and 930° C. are definitely of the N-type. But the crystallites so deposited are quite large, tend to be spaced from one another, and do not provide either the greatest peak inverse voltage or the greatest forward conductance of which the deposit is capable. However, by the annealing step described above, wherein the crystallites are heated to the point of incipient fusion but are prevented from complete coalescence, the film is made more uniform in texture and the spacing of the crystallites is diminished. In other words, the film is more like a continuous film than before, when examined under the microscope.

Our invention will be better understood in relation to a description of the accompanying drawing in which.

Figure 1:
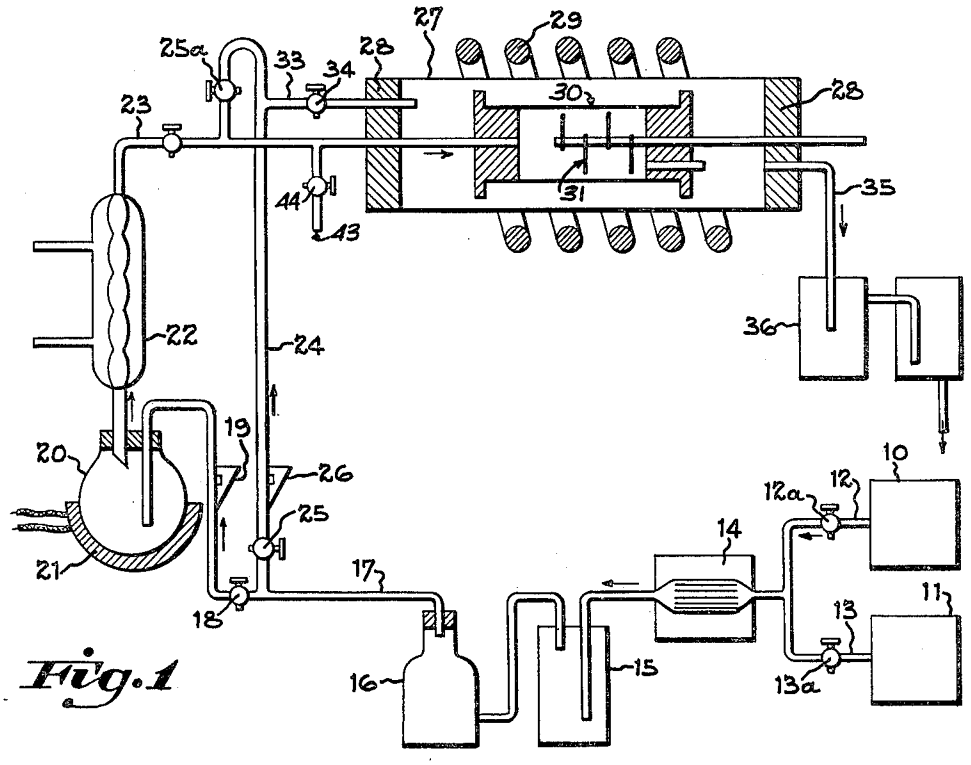
Figure 1 is a diagrammatic flow chart with the chamber in which the primary reaction occurs shown in section.

The process which takes place in the apparatus disclosed in Figure 1 involves the exposure of graphite elements to a mixture of hydrogen gas and gaseous germanium tetrachloride, the temperature of the graphite pieces being controlled and maintained by an electric high-frequency heating element in order to obtain the desired type of germanium deposit on the surface of the graphite.

Before the reaction is commenced, the entire system is flushed with helium gas. Next, hydrogen gas is passed through purifying equipment and into a vessel in which germanium tetrachloride is heated above its boiling point, after which the mixture of hydrogen gas and gaseous germanium tetrachloride is conducted to the main reaction chamber.

More particularly, a helium tank 10 and a hydrogen storage reservoir 11 are connected by conduits 12 and 13, respectively, to a deoxidizer 14. Conduit 12 is provided with a valve **12*a* and conduit 13 with a valve 13*a*. The gas passes through the deoxidizer, which may be composed of hot copper turnings, and then through a dehydrating train which may be composed of vessel 15 containing sulphuric acid and vessel 16 containing phosphorus pentoxide. The gas then passes through line 17, including a valve 18 and flow meter 19, into the germanium tetrachloride boiler 20 which is heated by element 21. Above the germanium tetrachloride boiler is mounted a reflux condenser 22**, the purpose of which is to bring about the saturation of the hydrogen gas.

The reflux condenser 22 is connected by conduit 23 to the assembly in which the main reaction occurs. A by-pass line 24, including valves 25, **25*a* and a flow meter 26**, is provided to permit the hydrogen enrichment of the gases supplied to the reaction chamber. This line by-passes the germanium boiler and the reflux condenser.

The assembly in which the main reaction takes place includes a quartz or vitreous tube 27 provided with end closures 28 and surrounded by a high-frequency electrical heater 29. Within the quartz tube is mounted a graphite tube 30 into which the gases are introduced by conduit 23. This graphite tube does not extend all the way through the quartz tube, but terminates short of the discharge end thereof. Graphite tube 30 is provided, at its interior, with transverse baffles 31. These baffle elements are made of graphite and constitute the base supports upon which germanium is to be deposited. The baffles 31 may be supported in any convenient manner, and the staggered disposition of the elements, as shown in Figure 1, has been found to be suitable. In addition, however, graphite tube 30 may itself be of rectangular shape in recognition of the fact that its inside surface also will be coated with germanium along with the baffles, whereby the walls of tube 30 may be cut to provide flat electronic elements. In place of using baffles 31 in the form of wafers as shown in Figure 1, various other graphites shapes may be employed.

From by-pass line 24, a conduit 33, provided with valve 34, enters the quartz tube 27, so that helium or hydrogen may be passed directly to the inside of the graphite tube or to the inside of the quartz tube, but on the outside of the graphite tube. Conduit 35 conducts unreacted gases from the discharge end of the quartz tube to a chilling device 36 which is maintained at a suitable condensing temperature.

As an example of the utilization of the described equipment, helium from helium storage tank 10 is first passed through the entire system and all conduits in the system to remove from the system all traces of air or other gases. Next, valve **12*a*, which controls the flow of the helium, is closed, and valve 13*a*, which controls the flow of hydrogen, is opened. The hydrogen passes through the deoxidizer 14, the sulfuric acid bath 15, and the phosphorus pentoxide container 16, then through conduit 17 to the germanium tetrachloride boiler 20 in which the germanium tetrachloride is heated by electrical heating element 21 to such a temperature as desired, which may range from room temperature to a temperature of as high as 83° C., the boiling point of germanium tetrachloride. Thus, the gases in the tetrachloride boiler 20 are not hotter than 83° C., and, in addition, are cooled by the reflux condenser 22**. The reflux condenser condenses out a portion of the germanium tetrachloride and thereby produces a saturated vapor containing a fixed amount of germanium tetrachloride.

The mixture of hydrogen and gaseous germanium tetrachloride passes through reflux condenser 22 and conduit 23 to the interior of graphite tube 30, then through outlet conduit 35 to the low temperature condenser 36. The graphite tube 30 is maintained at a temperature of substantially 700 to 930° C. by the high-frequency electrical heating element 29 in accordance with the principles previously discussed. Within the graphite tube 30, a reaction takes place between the hydrogen and the germanium tetrachloride whereby hydrogen tends to replace chlorine and/or to remove chlorine from the tetrachloride with the formation of gaseous hydrogen chloride. As a result of this reducing reaction, some of the germanium present is stripped of both chlorine and hydrogen and deposits or precipitates upon the graphite surfaces which are maintained at a temperature below the melting point of metallic germanium. The germanium deposit so achieved is extremely pure and is firmly bonded to the graphite. The waste gases are condensed, for example at about −80° C., in the condenser system 36 and may thereafter be conditioned for re-use.

The ratio of hydrogen to germanium tetrachloride may be anywhere from 50 to 300 volume equivalence of hydrogen to one germanium tetrachloride. For most purposes, however, a 100 to 1 ratio is satisfactory. The time of the operation may vary over the general range of from 2 to 10 hours, depending upon the rate of flow of the gas, the temperature employed and the ratio of hydrogen to germanium tetrachloride. For instance, the rate of flow of the gases may be so controlled that 40% of the germanium present in the germanium tetrachloride is precipitated as pure germanium over a period of 6 hours. The process is quite flexible and conditions may be varied to obtain a germanium recovery of from 10%, or less, up to 40%. The thickness of the germanium films on the graphite elements to be used as rectifiers should be approximately 10 to 60 microns, but the film may be built up to any desired thickness.

If the germanium deposit upon the quartz tube 27 becomes too heavy, the system may be flushed with chlorine at an elevated temperature to remove the germanium as germanium tetrachloride, which may then be re-used. In general, the amount of germanium deposited upon the walls of the quartz tube is not likely to be significant, since no germanium compounds are present in the quartz tube except by leakage through or beyond the graphite reactor.

Figures 2, 3:
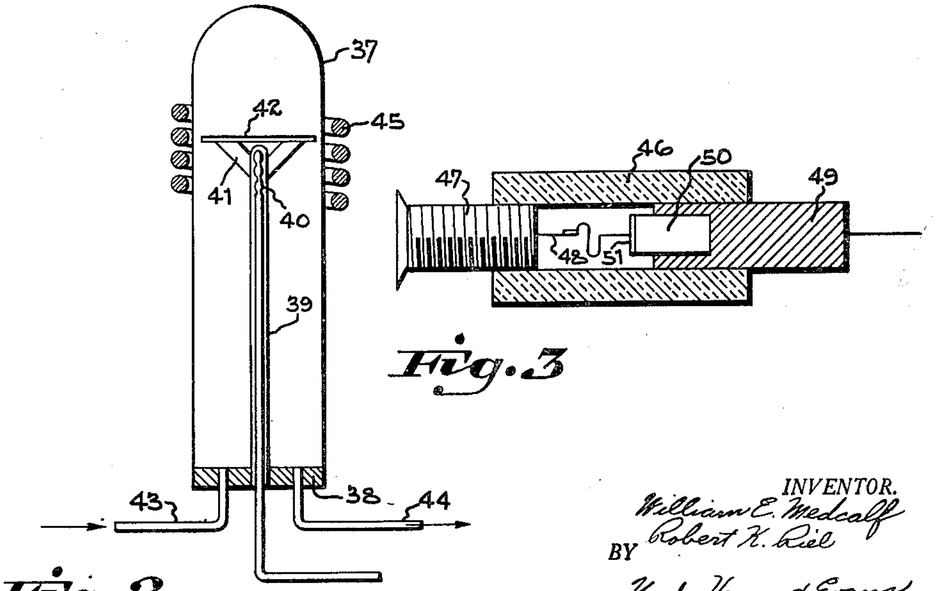
Figure 2 is a diagrammatic view of the chamber in which the secondary annealing reaction is conducted with the high-frequency heating coil shown in section.
Figure 3 is a sectional view of a rectifier which incorporates the novel element of the present invention.

Figure 2 of the drawing discloses apparatus for annealing a graphite element bearing a surface coating of germanium which was deposited by the process disclosed in relation to the description of Figure 1 of the drawing but at a temperature between 900 to 930° C. As indicated, a germanium coating deposited at the specified temperature is of the N-type which is desirable for rectification. Figure 2 discloses a quartz or inert vitreous tube 37 which is mounted in a vertical position and provided with a bottom closure 38. A small centrally located tube 39 extends upwardly from the bottom support; a thermocouple 40 is disposed within this tube 39 near the top thereof. On the top of the tube is mounted a support 41 for the graphite element 42 to be annealed. Two conduits 43 and 44 extend through bottom closure 38 to permit the interior of tube 37 to be flushed with helium, nitrogen or other nonreactive gas to remove air or reactive gases therefrom. High-frequency electric heating element 45 surrounds tube 37 at the level of the graphite support so that the graphite element being annealed may be heated to the desired degree by electric induction.

In operation, graphite element 42 is placed upon support 41, then air is exhausted from the interior of tube 37 by flushing, as described. After the atmosphere in the tube of tube 37 is completely unreactive, the high-frequency heating element is turned on and the temperature of the graphite is elevated to the point of incipient fusion of the germanium film, that is, a temperature at which the germanium crystallites fuse together somewhat but do not coalesce in liquid phase. In general, this condition is achieved at a temperature in the range of approximately 925 to 936° C., the exact temperature being affected somewhat by the purity of the germanium. When the germanium is very pure, incipient fusion occurs at approximately 936° C. However, if, for example, aluminum is present in the amount of one part in 1,000 by weight of Ge, the incipient fusion temperature is reduced to approximately 915° C.

The annealing operation is facilitated if aluminum is incorporated in the germanium coating, during the deposition thereof, in an amount in the general range of one part aluminum to one thousand to ten thousand parts germanium, by weight. This may be accomplished by heating a suitable gaseous aluminum compound source material, for example, aluminum bromide in a separate boiler, similar to the germanium tetrachloride boiler 20, and having a heater associated therewith, similar to element 21, and provided with a flow of hydrogen through the boiler to carry the volatilized aluminum bromide into the main reactor chamber through conduit 43 and valve 44 (Figure 1).

For example, in one typical run the germanium tetrachloride boiler 20 was maintained at 43° C. and its reflux condenser 22 was maintained at 21° C. The aluminum bromide boiler was maintained at 118° C. with no cooling water in the reflux condenser. By maintaining the flow of hydrogen through the tetrachloride boiler and the aluminum bromide boiler by adjustment of valves 18 and 44 to give a flow ratio of approximately 110 to 1, the deposition was produced of a germanium coating containing germanium and aluminum in the ratio of 1,000 to 1 by weight.

The graphite reactor 30 was maintained at a temperature of 920° C. for a period of two hours and ten minutes. A coating was formed of 1.474 square inches, having a thickness of 60 microns. The coated graphite element was then heated in a high-frequency induction furnace until incipient fusion began on the outer edges of the film. The temperature was maintained at a constant value at this stage (thermocouple reading was 915° C.) and fusion continued inwardly toward the center at a constant rate, so that a line of demarcation between fused and unfused film could be seen clearly. This temperature was maintained until approximately one-half the film had fused. The temperature was then gradually lowered, at the rate of approximately 10 degrees a minute, until a temperature of 550° C. was reached. The film was annealed at this temperature for three hours and then lowered to that of the room. The film was tested for rectifying properties with the following results:

| | Peak Inverse Voltage | Forward Conductance |
|---|---|---|
| (a) Unfused film | 15 to 20 volts | 1 milliampere at 1 volt. |
| (b) Fused film | 40 to 75 volts | 7 milliamperes at 1 volt. |

This forward conductance is equal to that of good massive germanium.

When a germanium film is fused, it tends to coalesce into spheres thus completely destroying the film. We have found, however, that germanium films deposited on a graphite base, and containing aluminum as a solute impurity in an amount of .01 to .001 per cent by weight, may be brought just to the point of incipient fusion, and then immediately lowered just below the fusion temperature without exhibiting the normal habit of coalescing into spheres. The resulting film is made more uniform in texture, and the spacing of the crystallites is diminished. In other words, the coating is more like a continuous film than before when examined under a microscope. In addition, the electrical properties are appreciably improved. The forward conductance and the peak inverse voltage are increased by two to three times the original value. The fusion does not disturb the fastness of the bond of the germanium to the graphite.

The reason for this phenomena may be due to the following:

1. The porous texture of graphite enables the formation of more firm and stable bonding with the germanium coating;

2. Aluminum lowers the surface tension of the germanium;

3. Aluminum decreases the tendency of the germanium to super-cool. It is known that pure germanium may super-cool as much as 235° C. (D. Turnbull and R. E. Cech. Journal of Applied Physics, 21, 804 [1950].) We have found that the presence of aluminum significantly decreases this value allowing germanium to solidify more rapidly after fusion.

Figure 3 of the drawing discloses a simple type of rectifier which incorporates a graphite element coated with a rectifying germanium film of the type described. The rectifier comprises a cylindrical plastic case 46, screw-threaded at one end to receive a metallic screw 47. Attached to the inner end of screw 47 is a thin tungsten wire 48 bent to provide a springlike action. In the end of the plastic case, opposite the end in which the screw is disposed, a nickel pin 49 is disposed. The graphite element 50 bearing germanium coating 51 is countersunk in the inner end of this nickel pin. The tungsten wire 48 extending from screw 47 bears against the germanium coating 51 on the graphite element 50. This assembly constitutes an efficient rectifier.

The germanium coated graphite elements of this invention may be used in place of massive germanium for various electronic purposes with the advantage of very material saving in the quantity of germanium required to perform a given electronic function.

Having described our invention, we claim:

1. An electronic device which comprises a film of germanium of the class consisting of P-type and N-type germanium physically bonded to the surface of a piece of graphite.

2. An electronic device comprising a film of germanium of the P-type physically bonded to the surface of a piece of graphite.

3. An electronic device comprising a film of germanium of the N-type physically bonded to the surface of a piece of graphite.

4. An electronic device comprising a film of crystallitic germanium of the N-type, said film being substantially 10 to 60 microns thick and being physically bonded to the surface of a piece of graphite.

5. The method of depositing germanium on graphite which comprises maintaining the graphite at a controlled temperature in the range of substantially 700 to 930° C. and surrounding the graphite with a mixture of germanium tetrachloride and hydrogen gases at a temperature at which the hydrogen reduces the germanium halide to metallic germanium whereby the liberated germanium bonds to the graphite.

6. The method which comprises heating gaseous reducible germanium and aluminum halides in a reducing atmosphere in the presence of each other and in the presence of a member presenting a graphite surface, to a temperature between 700 and 930° C., and exposing to said heated gases a member presenting a graphite surface heated to a temperature within said range of 700–930° C. thereby causing a film containing metallic germanium and aluminum to be deposited upon the graphite surface of said member.

7. The method which comprises heating germanium tetrachloride to a temperature between approximately 700 and 930° C. in the presence of a small percentage of a gaseous reducible aluminum halide and in the presence of a member presenting a graphite surface while the said graphitic member is also at a temperature between approximately 700 and 930° C., thereby causing to be deposited upon the said graphite surface conductive crystallites of metallic germanium containing a small percentage of metallic aluminum, then heating the film to the point of incipient fusion thereof without actually fusing the film, so as to diminish the spacing of the deposited crystallites therein.

8. An electronic circuit element comprising a graphite base member having upon a surface thereof a conductive film of germanium containing a small percentage of metallic aluminum distributed uniformly therein.

9. An electronic circuit element comprising a graphite base member having a film of metallic germanium thereon which contains from approximately 1 part by weight of metallic aluminum therein to each 1,000 to 10,000 parts of germanium.

10. An N-type germanium film on a surface thereof which film contains less than .0001% impurities.

11. The method of making an N-type germanium rectifying element which comprises exposing graphite at a temperature of substantially 900 to 930° C. to a mixture of germanium tetrachloride gas and hydrogen gas, whereby an N-type rectifying coating of germanium particles is deposited upon the graphite, then annealing coating so deposited by heating it to the point of incipient fusion, but without coalescing the particles of the germanium deposit, whereby the peak inverse voltage of the film and its forward conductance are both increased.

12. The method of making an electronic device which method comprises depositing a film of germanium upon graphite by exposing the graphite to a gaseous admixture of hydrogen and a germanium tetrahalide while the graphite and the gaseous admixture are at a temperature of substantially 700–930° C.

13. The method of making an electronic device which method comprises depositing a film of germanium upon graphite by exposing the graphite to a gaseous admixture of hydrogen and a germanium tetrachloride while the graphite and the gaseous admixture are at a temperature of substantially 700–930° C.

References Cited in the file of this patent

UNITED STATES PATENTS

| | | |
|---|---|---|
| 2,552,626 | Fisher et al. | May 15, 1951 |
| 2,556,711 | Teal | June 12, 1951 |
| 2,597,028 | Pfann | May 20, 1952 |
| 2,602,763 | Scaff et al. | July 8, 1952 |